Jan. 21, 1958     J. W. DORSAK ET AL     2,820,477
GAS MIXING VALVE
Filed March 5, 1956
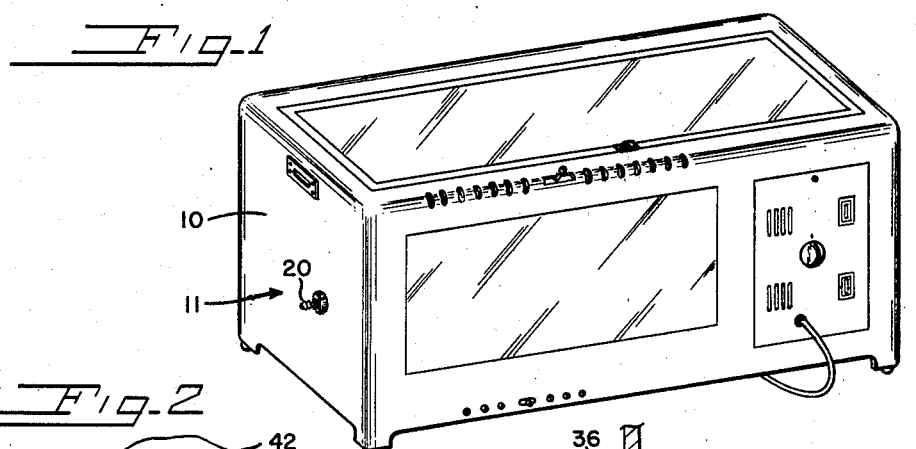
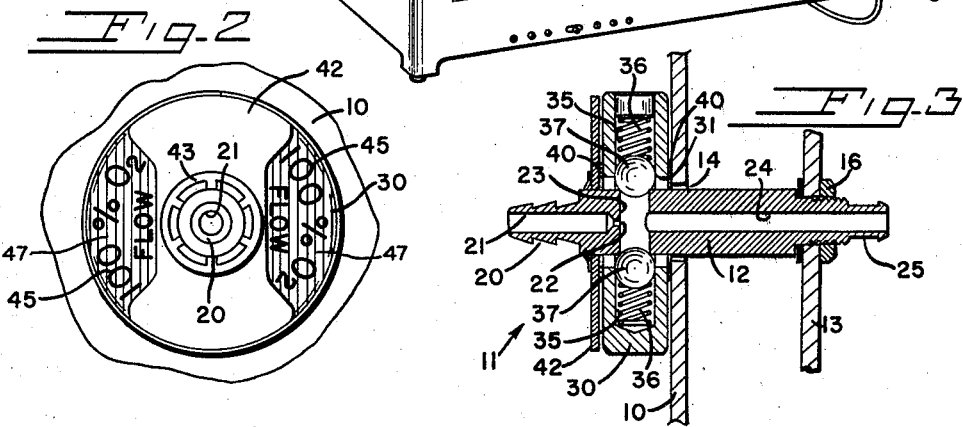
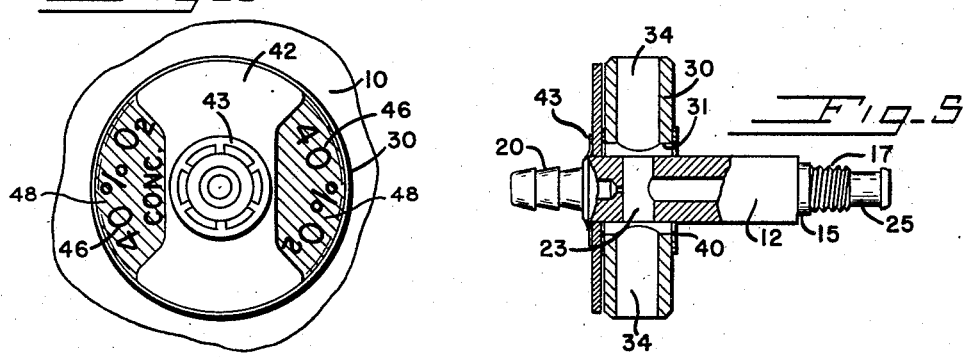
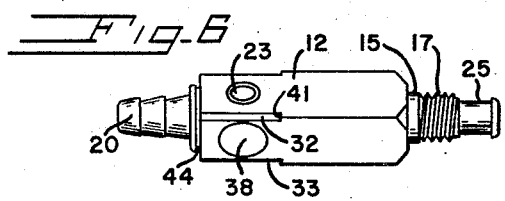
INVENTOR.
JOHN W. DORSAK
BY THOMAS F. VAN DENBERG
DES JARDINS, ROBINSON & KEISER
*Howard M. Keiser*
THEIR ATTORNEYS United States Patent Office 2,820,477
Patented Jan. 21, 1958

2,820,477

GAS MIXING VALVE

John W. Dorsak, Lyndhurst, and Thomas F. Van Denberg, Chagrin Falls, Ohio, assignors to The Gordon Armstrong Company, Inc., Cleveland, Ohio, a corporation of Ohio Application March 5, 1956, Serial No. 569,632

7 Claims. (Cl. 137—604)

This invention relates to a gas mixing valve of the aspirator type and more particularly, to a valve for controlling the concentration of oxygen delivered into a baby incubator.

In connection with the treatment of premature babies in baby incubators it very often becomes necessary to supply a limited quantity of oxygen to the air being furnished to the baby inside the cubicle. For this purpose, it is desirable to deliver the oxygen into the incubator through a mixing or proportioning type of valve which will dilute the oxygen with air to the degree necessary to provide the desired oxygen concentration within the inclosure. It has been found that in most cases, a mixture of approximately 40 parts of oxygen to 60 parts of air will, when delivered into the incubator in suitable quantities, provide a satisfactory concentration of oxygen therein. In emergencies however, it may be necessary to drastically increase the amount of oxygen supplied to the baby and to provide, without delay, a 100% flow of oxygen into the incubator. There are no known mixing valves on the market which will provide the desired 40% concentration of oxygen over the normal liter flow range of from 3–10 liters of oxygen per minute, or which will permit rapid conversion to 100% oxygen flow in case of emergencies.

Accordingly, it is an object of the present invention to provide a gas mixing valve which will maintain a predetermined air to gas ratio over a considerable range of rates of flow and which may quickly and easily be adjusted to provide a 100% flow of the gas in place of a mixture of gas and air.

Another object of the invention is to provide an oxygen limiting valve for baby incubators which will provide an oxygen concentration of approximately 40% over a liter flow range of from 3–10 liters of oxygen per minute.

Another object of the invention is to provide an oxygen limiting valve for baby incubators which can be quickly manipulated to provide either a 100% flow of oxygen into the incubator or a mixture of approximately 40% oxygen and 60% air.

With these and other objects in view which will become apparent from the following description, the invention includes certain novel features of construction and combinations of parts the essential elements of which are set forth in the appended claims and a preferred form or embodiment of which will hereinafter be described with reference to the drawings which accompany and form a part of this specification.

In the drawings:

Fig. 1 is a perspective view of a baby incubator showing the mixing valve mounted on the side panel thereof.

Fig. 2 is an end view of the mixing valve showing the handle turned to one position.

Fig. 3 is a cross-sectional elevation of the mixing valve with the handle in the Fig. 2 position.

Fig. 4 is an end view of the valve showing the handle turned to another position.

Fig. 5 is a cross-sectional elevation of the valve with the handle in the Fig. 4 position.

Fig. 6 is a view of the valve body per se.

The gas mixing valve which forms the subject matter of the present application utilizes the principle of aspiration to produce a mixture of gas and air. In the present valve, a jet stream of gas passing through an orifice in the valve creates a low pressure due to its velocity and draws in another gas, in this case air, through inlet ports in the valve and produces the desired mixture of the gases. Although designed especially for use with baby incubators in which a jet stream of pure oxygen is mixed with ambient air, the device comprising our invention will be effective to mix other gases on a similar principle.

In Fig. 1, the device is shown mounted on the side panel 10 of a baby incubator where the mixing valve is indicated by reference numeral 11. As best shown in Fig. 3, the valve includes an elongated valve body 12 which is preferably made of sufficient length to enable it to pass through a side panel of considerable thickness, such as the double-wall construction shown in Fig. 3. This construction includes, in addition to the outside panel 10, an inside panel 13 spaced therefrom. The valve body 12, which may be square in cross-section, passes through an aperture 14 provided therefor in the outside panel 10 and through a smaller circular opening arranged in axial alignment therewith in the inside panel 13. The circular aperture in the panel 13 is suitably made of a size which will snugly receive a tenon 15 turned on the right-hand end of the valve body 12. The valve body is secured to the inside panel 13 by a nut 16 which screws onto a threaded shank 17 formed on the end of the valve body.

On its left-hand end, the valve body 12 is provided with a nipple 20 for receiving a flexible hose which may be connected with the supply of oxygen. The nipple is connected by a channel 21 with an orifice 22 of reduced diameter which opens into an induction chamber 23 extending transversely through the valve body. Also entering the inducting chamber 23 directly across from the orifice 22 is a conduit 24 which extends longitudinally of the valve body and communicates with a gas outlet 25 provided on the right-hand end of the valve body. Hence, oxygen entering the gas inlet 20 will pass with high velocity through the orifice 22, through the induction chamber 23, and into the left-hand end (Fig. 3) of the conduit 24. The size and relation of the orifice 22 with respect to the entrance of the conduit 24 is such as to cause the air drawn into the conduit 24 from the induction chamber 23 by the jet stream of oxygen, to be substantially proportional to the quantity of oxygen flowing through the valve so that the oxygen concentration will remain substantially constant for different rates of flow of oxygen. From our experience with this valve, it appears that the maintenance of a constant ratio of oxygen to air at different rates of oxygen flow through the valve is due to the non-turbulent condition of the jet stream of oxygen as it passes through the induction chamber and into the conduit 24. In the present valve in which the orifice, the induction chamber and the conduit are all of circular cross-section, we have found that by making the cross-sectional area of the induction chamber approximately 38 times that of the orifice, and the cross-sectional area of the conduit 24 approximately 24 times that of the orifice, the mixture of oxygen and air passing through the gas outlet 25 into the incubator cubicle will contain approximately 36½% to 38% of oxygen over a liter flow range of from 3–15 liters of oxygen per minute. Since the normal liter flow range of oxygen for this type of service is from 3–10 liters per minute, it will be seen that the present valve is well adapted to provide the desired concentration of oxygen to the infant inside the incubator.

In the case of sudden emergencies, it may be necessary to supply 100% flow of oxygen through the valve and into the incubator cubicle. For this purpose we have provided the valve with a circular handle 30 which is provided with a central aperture 31 of circular cross-section which is of sufficient size to slide over the chamfered corners 32 formed on the left-hand end 33 of the valve body. The handle is provided with a pair of radially extending air ducts 34 which are in axial alignment with one another and which, when the handle is in the Fig. 5 position, are also in axial alignment with the induction chamber 23. The handle is also provided with a pair of radially extending bores 35 which are adapted to receive compression springs 36 and balls 37. The bores 35 are located at a 90° angle with respect to the ducts 34 and, when the handle is in the position shown in Fig. 3, the balls 37 will seat in the ends of the induction chamber 23 and prevent air from being drawn into the conduit 24 for mixture with the oxygen. When the handle is turned 90°, the balls will ride over the chamfered corners 32 (Fig. 6) and seat in countersinks 38 provided therefor on opposite sides of the valve body. The spring pressed balls 37 thereby function both as detents to yieldably urge the handle 30 to rotate either to the position shown in Fig. 3, where the balls seal off the induction chamber, or to the position shown in Fig. 5 where the ducts 34 permit air to flow into the induction chamber and the balls seat in the countersinks 38.

The handle is held against axial displacement on the left-hand end 33 of the valve body by a fastening means including a pair of washers 40 which are provided with circular apertures of the same diameter as the aperture 31 in the handle. The washers 40 thereby fit snugly over the chamfered corners 32, the inside washer bearing against shoulders 41 formed by the termnation of the chamfered corners 32. The washers and handle are retained in place by a shield plate 42 which is provided with a square aperture of the same size as the valve body. A self-locking retaining ring 43 engages with an annular groove 44 provided on the left-hand end of the valve body to hold the shield plate 42 in place. The outside face of the handle 30 is inscribed with indicia 45 on a red background 47 for indicating 100% oxygen flow when the handle is in the Fig. 3 position, and also with indicia 46 (Fig. 4) on a green background 48 for indicating 40% oxygen concentration when the handle is in the Fig. 5 position. When the indicia 45 on a red background is exposed to view as shown in Fig. 2, the indicia 46 will lie beneath the shield plate 42 and be hidden from view. Likewise, when the indicia 46 on a green background are exposed to view as shown in Fig. 4, the indicia 45 will be hidden from view by the shield plate.

The gas outlet 25 is designed to receive the end of a flexible hose which may be attached at its other end to a funnel or baby mask which may be placed directly over the baby's face inside the incubator if this technique is desired for extremely high concentrations of oxygen. Hence, with the setting of the handle for 100% oxygen flow as shown in Fig. 3, a high concentration of oxygen may be provided inside the incubator, or inside the baby mask, to take care of any emergencies which may arise during the treatment of the baby. With the handle set in this position, the nurse or doctor can obtain the desired concentration of oxygen to overcome the emergency by adjusting the liter flow gauge on the oxygen tank (not shown) and by checking the oxygen concentration in the incubator with an oxygen analyzer.

From the foregoing disclosure, it will be apparent that we have designed a mixing valve which will provide the desired oxygen concentration over the normal liter flow range and which may quickly be given one-quarter turn in either direction to provide 100% flow of oxygen in case of emergencies. The valve may be restored to its normal setting with equal ease and with minimum attention on the part of the operator by an additional one-quarter turn in either direction. The handle will be retained in either of its two settings inasmuch as the spring pressed balls 37, which act to seal off the air flow into the mixing valve, will yieldably urge the handle into either of the two positions shown in Figs. 3 and 5.

While we have described our invention in connection with one possible form or embodiment thereof and have used, therefore certain specific terms and language herein, it is to be understood that the present disclosure is illustrative rather than restrictive and that changes and modifications may be resorted to without departing from the spirit of the invention or the scope of the claims which follow.

Having thus described the invention, what is claimed as new and useful and desired to be secured by United States Letters Patent, is:

1. An aspirator type of valve for mixing a gas with air to provide a predetermined concentration of gas comprising an elongated valve body, a gas inlet on one end of said body and a gas outlet on the other end of body, a pair of side openings located on opposite sides of said body for admitting air into the valve for mixture with the gas passing therethrough, a circular handle journaled on said valve body over said side openings for rotation about its central axis, means in said handle defining a pair of radially extending air ducts which are adapted to register with said side openings in one position of said handle, a pair of elements carried by said handle arranged to register with said side openings in another position of said handle, and means for resiliently urging said elements inwardly toward said openings to close the same when said handle is in said other position.

2. The valve of claim 1 including means on said body cooperating with said elements for yieldably urging said handle to rotate either to said one position or to said other position and to remain there until manually turned to the other position.

3. The valve of claim 2 wherein said elements are balls received in holes provided therefor in said handle.

4. The valve of claim 3 including indicia inscribed on said handle for indicating its position.

5. The valve of claim 4 including a shield plate fastened to said valve body adapted to cooperate with the indicia inscribed on said handle to indicate the position of the handle.

6. The valve of claim 3 including contrasting colors impressed upon said handle for indicating its position.

7. The valve of claim 6 including a shield plate fastened to said valve body adapted to cooperate with the contrasting colors impressed upon said handle to indicate the position of the handle.

References Cited in the file of this patent

UNITED STATES PATENTS

| Number | Name | Date |
|---|---|---|
| 975,870 | Jones et al. | Nov. 15, 1910 |
| 1,992,319 | Maggenti | Feb. 26, 1935 |
| 2,028,177 | Williams | Jan. 21, 1936 |
| 2,261,531 | Thomas | Nov. 4, 1941 |
| 2,353,535 | Young | July 11, 1944 |
| 2,374,516 | Wendell | Apr. 24, 1945 |
| 2,379,551 | Talley | July 3, 1945 |
| 2,669,418 | Brumbaugh | Feb. 16, 1954 |
| 2,715,512 | Miller et al. | Aug. 16, 1955 |
| 2,720,387 | Dorsak | Oct. 11, 1955 |

FOREIGN PATENTS

| 314,068 | Germany | Aug. 23, 1919 |